US008767551B2

(12) United States Patent
Goldfarb et al.

(10) Patent No.: US 8,767,551 B2
(45) Date of Patent: Jul. 1, 2014

(54) SYSTEM AND METHOD FOR FLOW TABLE MANAGEMENT

(75) Inventors: Eithan Goldfarb, Ness Ziona (IL);
Yuval Altman, Herzeliya (IL); Naomi Frid, Modi'in (IL); Gur Yaari, Tel Aviv (IL)

(73) Assignee: Verint Systems, Ltd., Herzelia, Pituach (IL)

( * ) Notice: Subject to any disclaimer, the term of this patent is extended or adjusted under 35 U.S.C. 154(b) by 57 days.

(21) Appl. No.: 13/358,482

(22) Filed: Jan. 25, 2012

(65) Prior Publication Data

US 2012/0213074 A1 Aug. 23, 2012

(30) Foreign Application Priority Data

Jan. 27, 2011 (IL) .......................................... 210897

(51) Int. Cl.
*H04L 1/00* (2006.01)

(52) U.S. Cl.
USPC .......................................... 370/235; 370/392

(58) Field of Classification Search
USPC ................................................. 370/235, 392
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,283,468 B1 | 10/2007 | Hill et al. | |
| 7,441,022 B1 | 10/2008 | Schuba et al. | |
| 7,466,816 B2 | 12/2008 | Blair | |
| RE40,634 E | 2/2009 | Blair et al. | |
| 7,587,041 B2 | 9/2009 | Blair | |
| 2002/0078370 A1* | 6/2002 | Tahan ............................ | 713/200 |
| 2008/0014873 A1 | 1/2008 | Krayer et al. | |
| 2008/0077705 A1* | 3/2008 | Li et al. .......................... | 709/236 |
| 2008/0239956 A1* | 10/2008 | Okholm et al. ................ | 370/232 |
| 2008/0261192 A1 | 10/2008 | Huang et al. | |
| 2008/0267184 A1 | 10/2008 | Arisoylu et al. | |
| 2008/0285464 A1 | 11/2008 | Katzir | |
| 2009/0010259 A1* | 1/2009 | Sirotkin ......................... | 370/392 |

FOREIGN PATENT DOCUMENTS

WO 2008075224 A1 6/2008

OTHER PUBLICATIONS

Extended European search report, dated Apr. 26, 2012, received from the European Patent Office in connection with corresponding European patent application No. 12152453.2.

Claise, B., et al., "Specification of the IPFIX Protocol for the Exchange of IP Traffic Flow Information," draft-ietf-ipfix-protocol-26.txt, Cisco Systems, Inc., vol. ipfix, No. 26, Sep. 1, 2007, 66 pages.

(Continued)

*Primary Examiner* — Sai-Ming Chan
(74) *Attorney, Agent, or Firm* — Meunier Carlin & Curfman

(57) ABSTRACT

Methods and systems for managing the actions that are applied to packet flows by packet processing systems. A packet processing system maintains a flow table, i.e., a list of active flows and respective actions to be applied to the flows. The system classifies each incoming packet into a respective flow, and processes the packet in accordance with the action that is specified for this flow in the flow table. Typically, the system deletes a packet flow from the flow table when it becomes inactive, e.g., when no packets belonging to the flow arrive within a certain time-out period.

17 Claims, 2 Drawing Sheets

(56) References Cited

OTHER PUBLICATIONS

Luo, Jianying, et al., "Prototyping Fast, Simple, Secure Switches for Ethane," 15th IEEE Symposium on High-Performance Interconnects, Aug. 1, 2007, pp. 73-82.

Muenz, C., et al., "Configuration Data Model for IPFIX and PSAMP," draft-ietf-ipfix-configuration-model-08, Cisco Systems, Inc., Oct. 25, 2010, 125 pages.

Ryu, Bo, et al., "Internet Flow Characterization: Adaptive Timeout Strategy and Statistical Modeling," Dec. 2001, 12 pages.

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

\* cited by examiner

SYSTEM AND METHOD FOR FLOW TABLE MANAGEMENT

FIELD OF THE DISCLOSURE

The present disclosure relates generally to packet processing, and particularly to methods and systems for managing packet flows.

BACKGROUND OF THE DISCLOSURE

Communication packet inspection techniques are used in a wide variety of applications. For example, in some applications, communication packets are analyzed in an attempt to detect communication traffic of interest. Some data security systems inspect packets in order to detect information that leaks from an organization network. Some firewalls and intrusion detection systems inspect packets in order to identify illegitimate intrusion attempts or malicious traffic.

SUMMARY OF THE DISCLOSURE

An embodiment that is described herein provides a method in a system that processes communication packets. The method includes maintaining a list of active packet flows and respective actions that are specified for application to the packet flows. Input packets are classified into the packet flows, and each input packet is applied a respective action in accordance with the list. Different respective time-out periods are defined for different ones of the packet flows on the list. Upon detecting that no packet belonging to a given packet flow was accepted within a respective time-out period of the given packet flow, the given packet flow is deleted from the list of the active flows.

In some embodiments, maintaining the list includes storing, for each packet flow, a respective time stamp that indicates a respective time at which a most recent packet belonging to the packet flow was accepted, and detecting that no packet was accepted within the time-out period includes comparing a current time to the respective time stamp of the given packet flow. In an embodiment, maintaining the list includes storing the time-out periods on the list in association with the respective packet flows.

In another embodiment, defining the time-out periods includes applying a predefined criterion to the respective packet flows. In yet another embodiment, defining the time-out periods includes setting the time-out periods based on respective protocol types used for sending the respective packet flows. In still another embodiment, defining the time-out periods includes setting the time-out periods based on respective application types whose data are conveyed by the respective packet flows.

In a disclosed embodiment, for a first packet flow having a first characteristic inter-packet interval and a second packet flow having a second characteristic inter-packet interval that is larger than the first characteristic inter-packet interval, defining the time-out periods includes setting respective first and second time-out periods for the first and second packet flows, such that the second time-out period is longer than the first time-out period.

In some embodiments, the method includes selecting the given packet flow for evaluation of the time-out period based on a predefined selection criterion. In a disclosed embodiment, maintaining the list includes representing the list by a hash table, classifying the input packets includes computing a respective hash index for each input packet and accessing the hash table using the hash index, and the selection criterion specifies, upon receiving a given input packet having a given hash index, selection of one or more of the packet flows corresponding to the given hash index.

There is additionally provided, in accordance with an embodiment that is described herein, a method in a system that processes communication packets. The method includes maintaining a set of packet processing rules and a list of packet flows. Respective actions for application to the packet flows are defined based on the rules. A change in the packet processing rules is accepted. An input packet is classified into a packet flow from the list. A respective action applicable to the packet flow is verified to match the packet processing rules only upon arrival of a first packet belonging to the packet flow following the change in the packet processing rules. The verified action is applied to the input packet.

In some embodiments, maintaining the list includes storing respective time stamps that indicate respective times at which most recent packets belonging to the respective packet flows were accepted, and verifying that the action matches the rules includes comparing the action to the rules only when a respective time stamp of the packet flow is later than an occurrence time of the change in the rules. The method may include updating the action on the list upon detecting that the respective time stamp of the packet flow is earlier than the occurrence time of the change There is additionally provided, in accordance with an embodiment that is described herein, apparatus including a memory and processing circuitry. The memory is configured to hold a list of active packet flows and respective actions that are specified for application to the packet flows. The processing circuitry is configured to maintain the list, to classify input packets into the packet flows, to apply to each input packet a respective action in accordance with the list, to define different respective time-out periods for different ones of the packet flows on the list, and, upon detecting that no packet belonging to a given packet flow was accepted within a respective time-out period of the given packet flow, to delete the given packet flow from the list of the active flows.

There is further provided, in accordance with an embodiment that is described herein, apparatus including a memory and processing circuitry. The memory is configured to hold a set of packet processing rules and a list of packet flows. The processing circuitry is configured to maintain the set and the list, to define, based on the rules, respective actions for application to the packet flows, to accept a change in the packet processing rules, to classify an input packet into a packet flow from the list, to verify that a respective action applicable to the packet flow matches the packet processing rules only upon arrival of a first packet belonging to the packet flow following the change in the packet processing rules, and to apply the verified action to the input packet.

The present disclosure will be more fully understood from the following detailed description of the embodiments thereof, taken together with the drawings in which:

DETAILED DESCRIPTION OF EMBODIMENTS

Overview

Figure 1:
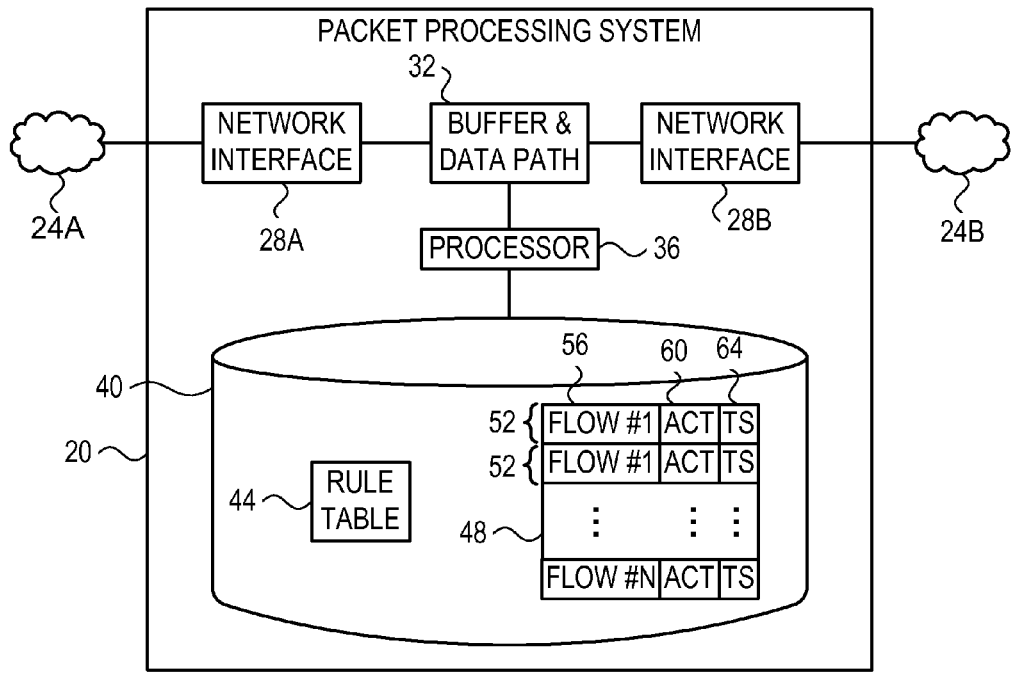
FIG. 1 is a block diagram that schematically illustrates a packet processing system, in accordance with an embodiment that is described herein.

Some packet processing systems, such as firewalls, Data Leakage Prevention (DLP) systems, Intrusion Detection Systems (IDS), Intrusion Prevention Systems (IPS) and Lawful Interception (LI) systems, classify communication packets into flows and apply various actions to the flows. For example, packet flows can be selectively blocked or forwarded for further analysis.

Embodiments that are described herein provide improved methods and systems for managing the actions that are applied to packet flows by packet processing systems. The disclosed techniques reduce the computational complexity and memory requirements of packet processing systems, and thereby increase system throughput and reduce cost. These techniques are particularly effective in large systems that handle millions of flows simultaneously.

In some embodiments, a packet processing system maintains a flow table, i.e., a list of active flows and respective actions to be applied to the flows. The system classifies each incoming packet into a respective flow, and processes the packet in accordance with the action that is specified for this flow in the flow table. Typically, the system deletes a packet flow from the flow table when it becomes inactive, e.g., when no packets belonging to the flow arrive within a certain time-out period.

Selection of the time-out period has a considerable impact on system performance: Short time-out periods increase the likelihood of deleting valid flows and having to re-define them in the flow table when subsequent packets arrive. Long time intervals increase memory requirements and computational complexity, since flows that are in fact inactive remain in the flow table for a long period of time before deletion. Long time out periods may also lead to erroneous actions, since the system may miss the termination of one flow and the initiation of another flow having the same flow key.

In some disclosed embodiments, the system defines a separate time-out period for each flow in the flow table. The time-out period of a given flow is typically set individually and independently of time-out periods of other flows. For example, flows that are characterized by large inter-packet intervals are typically assigned large time-out periods, and vice versa. Using this technique, each flow can be assigned a time-out period that matches its individual characteristics, rather than a sub-optimal time-out period that attempts to balance the characteristics of different flow types.

In some embodiments, the system maintains a set of packet processing rules and derives the actions that are specified in the flow table from the rules. When the set of rules changes over time, the actions in the flow table should typically be updated to match the current rules. In practice, however, the flow table is often large, and updating it exhaustively in response to each rule change may be prohibitive.

Therefore, in some disclosed embodiments, the system updates the actions in the flow table selectively, in response to incoming packets. When a packet belonging to a certain flow arrives, the system checks whether a rule change has occurred since arrival of the previous packet in this flow. If so, the action specified for this flow in the flow table may be invalid in view of the updated rules, and the system updates the action as necessary. If the rules did not change since arrival of the previous packet in the flow, the currently-specified action is assumed valid.

This technique enables the system to update the actions in the flow table only when necessary—once per flow for each rule change. The initial checking step (checking whether the rules have changed since the previous packet in the flow) can be carried out efficiently, e.g., in software, by comparing time stamps.

System Description

FIG. 1 is a block diagram that schematically illustrates a packet processing system 20, in accordance with an embodiment that is described herein. System 20 may be used in any suitable application that applies actions selectively to packet flows. For example, system may comprise a firewall, a Data Leakage Prevention (DLP) system, an Intrusion Detection System (IDS), an Intrusion Prevention System (IPS) or a Lawful Interception (LI) system.

System 20 receives communication packets from a communication network 24A, classifies the packets into flows, and applies certain actions to the flows. The term "packet flow" or "flow" is used to describe any sequence of packets that carries application data between endpoints. A given flow is typically identified by a specific combination of packet attributes. Flows can be unidirectional or bidirectional. Flows can be defined at various granularities, depending on the choice of packet attributes.

In the present example, system 20 monitors the packet flows that are communicated between network 24A and another communication network 24B, and applies various actions to these flows. Networks 24A and 24B typically comprise Internet Protocol (IP) networks. In an example DLP application, network 24A comprises an enterprise or organizational network, network 24B comprises the Internet, and system 20 selectively blocks flows containing material that is not permitted to exit network 24A. In an example firewall or IPS application, network 24A comprises the Internet, network 24B comprises an enterprise or organizational network, and system 20 selectively blocks illegitimate packet flows, e.g., flows containing illegitimate or malicious content, from entering network 24B. In an example LI application, system 20 monitors the packets communicated in network 24A, and selectively sends packet flows of interest for further analysis, e.g., to a monitoring center or analytics system. In LI applications network 24B may be omitted.

System 20 comprises network interfaces 28A and 28B for communicating with networks 24A and 24B, respectively. A buffer & data path unit 32 buffers packets arriving from network 24A, e.g., packets that are in transit between network 24A and 24B. A processor 36 manages the operation of system 20 and in particular carries out the methods described herein. In some embodiments, unit 32 also applies certain processing to the packets on behalf of processor 32. For example, unit may pre-process the packets before processing by processor 36, and/or execute actions specified by processor 36, such as selectively block certain packet flows, selectively allow certain packet flows to pass, or selectively forward certain packet flows to a specified destination.

(Although the embodiments described herein refer to packets and packet flows that are sent from network 24A to network 24B, the disclosed techniques can be applied in mixed applications that process packets in both directions, e.g., in flows that involve bidirectional communication.)

System 20 comprises a memory 40 that is used by processor 36. Memory 40 may comprise any suitable type of memory, such as Random Access Memory (RAM) and/or non-volatile (e.g., Flash) memory. In particular, memory 40 holds two data structures that are maintained by processor 36 and are described in detail below: A rule table 44 and a flow table 48. Both tables are managed by processor 36.

Rule table 44 holds a set of packet processing rules, which define how packets are to be processed. In some embodiments the rules are defined in terms of packet attributes (e.g., source address, destination addresses or port). In some embodiments the rules are defined at high level, e.g., in terms of the application or high-level protocol to which the packets belong. Generally, however, any suitable type of rules can be used. The rules may be provided to system 20 using any suitable method, such as by operator configuration using a suitable management interface (not shown in the figure). The rules may change over time during system operation, either automatically by processor 36 or by operator re-configuration.

Flow table 48 holds a list of flows that are currently regarded as active. Each active flow is represented by a respective entry 52 in flow table 48. Each entry 52 comprises a flow identification field 56 and an action field 60. In a typical system, flow table 48 may comprise hundreds of thousands, or even millions of entries. In one example embodiment, a 1 Gbps link contains on the order of one million flows at any given time, and the rate at which new flows are added (and old flows are deleted) is on the order of 25000 per second.

Flow identification field 56 of a given entry 52 specifies the packet attributes that identify the flow. Packet attributes may comprise, for example, source and/or destination IP address, source and/or destination port, protocol type (e.g., UDP or TCP), Virtual Local Area Network (ULAN) identifier, and/or any other suitable packet attribute.

Action field 60 of a given entry 52 specifies one or more actions that are to be applied to the packets in the flow. Specified actions may comprise, for example, blocking (discarding) the packets, allowing the packets to pass without interference, forwarding the packets (or copies of the packets) to a specified destination, modifying the packets in a certain way before allowing them to pass, triggering an alert based on the packets, or any other suitable action.

In a typical configuration, data path unit 32 classifies each incoming packet to one of the active flows in flow table 48 (or creates a new flow if no match is found), and then processes the packet in accordance with the action that is specified in the action field of the entry of that flow.

Typically, the actions that are specified in action fields 60 of entries 52 are derived by processor 36 from the set of rules in rule table 44. This a-priori translation enables data path unit 32 to make packet processing decisions using simple look-up operations in table 48, rather than evaluating complex rules per packet.

In some embodiments, entry 52 of a given flow in table 48 comprises a time stamp field 64, which indicates the time-of-arrival of the most recent packet belonging to the flow. Field 64 is typically updated by data path unit 32 continually. The time-of-arrival information is used by processor 36, for example, for deleting entries of inactive flows from flow table 48 and for updating action field 60 in response to changes in the packet processing rules. These functions are described in detail further below.

The configuration of system 20 shown in FIG. 1 is an example configuration, which is chosen purely for the sake of conceptual clarity. In alternative embodiments, any other suitable system configuration can also be used. The elements of system 20 may be implemented in hardware, e.g., in one or more Application-Specific Integrated Circuits (ASICs) or Field-Programmable Gate Arrays (FPGAs). Alternatively, some system elements can be implemented using software, or using a combination of hardware and software elements. The methods described herein can be partitioned between the elements of system (e.g., between data path unit 32 and processor 36) in any suitable way. In the present context, unit 32 and processor 36 are sometimes referred to jointly as processing circuitry that carries out the disclosed techniques.

Typically, processor 36 comprises a general-purpose processor, network processor or other processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. Example processors may comprise the XLR family produced by NetLogic Microsystems (Santa Clara, Calif.), the OCTEON family produced by Cavium Networks (Mountain View, Calif.), or the MPC8572 processor produced by Freescale Semiconductor (Austin, Tex.).

Deleting Inactive Flows Based on Flow-Specific Time-Out Periods

Flow table 48 holds a respective entry 52 for each flow that is regarded as active. In some embodiments, processor 36 identifies flows that have become inactive, and deletes their entries from the flow table. This clean-up process is important for maintaining system performance, since it clears valuable memory resources for use by subsequent flows.

Typically, processor 36 detects an inactive flow by checking the time that elapsed since the arrival of the most recent packet in the flow. This time-of-arrival, as noted above, is stored in time stamp field 64 of entry 52. If the time since the most recent packet exceeds a certain time-out period, processor 36 regards this flow as inactive and removes its entry 52 from flow table 48.

In practice, however, a single time-out period may not suit all the flows in an optimal manner, and applying the same time-out period to all flows may cause performance degradation. For example, different flows may be characterized by different inter-packet intervals. In such a scenario, a single time-out period may prove too short for some flows or too long for others.

Thus, in some embodiments, system 20 defines a separate and independent time-out period for each flow. Thus, different flows may be assigned different time-out periods. This individual setting enables system 20 to match the time-out period to the individual characteristics of each flow. This technique reduces the probability of erroneously deleting flows that are active but characterized by large inter-packet intervals. On the other hand, this technique deletes flows as soon as they become inactive, without waiting an unnecessarily long time period before deletion.

Processor 36 may define the time-out period for a particular flow based on any suitable criteria. The time-out period may depend, for example, on the type of protocol used in the flow (e.g., setting a certain time-out period for TCP flows and another time-out period for UDP flows), on the application whose content is transferred by the flow, or using any other suitable property.

For example, TCP flows typically terminate with a FIN message, but in some cases the packets may arrive out of order. In an example embodiment, processor 36 initially sets a relatively large time-out period for a given TCP flow. Upon detecting a FIN message belonging to the flow, the processor changes the time-out period to a short value.

In UDP flows, on the other hand, there is no definite message indicating the end of the flow. Moreover, in UDP it is often impossible to identify the application based on the port used. Thus, in some embodiments, processor 36 may apply Deep Packet Inspection (DPI) techniques to identify the application and set the time-out period accordingly. For example, if processor 36 identifies that the flow comprises a Real Time Protocol (RTP) flow, in which the packet rate is high, the processor can set the time-out period to an order of several seconds. For a UDP flow in which processor 36 cannot identify the application, the processor may set the time-out period to thirty seconds or more.

The TCP and UDP scenarios above are described purely by way of example. In alternative embodiments, processor 36 may set the time-out period for a given flow in any other suitable manner. For example, processor 36 may set the time-out period of each flow based on the source or destination IP address or port number that identify the flow.

In an example embodiment, the time-out period of each flow is stored in an additional field (not shown in the figure) in the respective entry 52 of that flow. In alternative embodiments, however, processor 36 may store the time-out periods of the various flows in any other suitable location.

Figure 2:
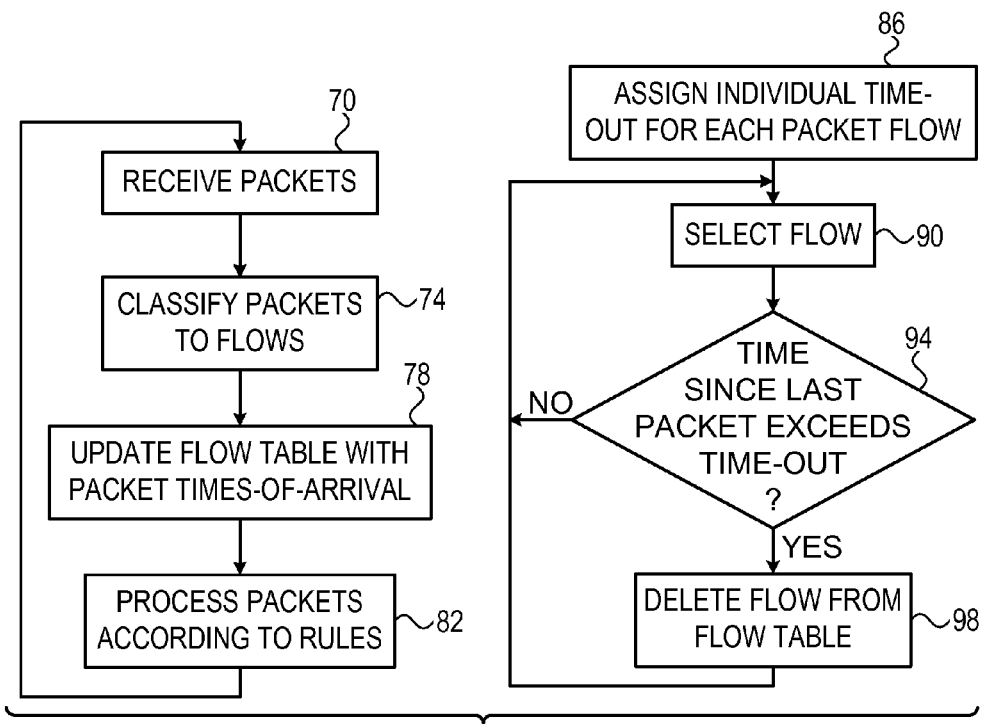
FIGS. 2 and 3 are flow charts that schematically illustrate methods for managing a flow table in a packet processing system, in accordance with embodiments that are described herein.

FIG. 2 is a flow chart that schematically illustrates a method for managing flow table 48 in packet processing system 20, in accordance with an embodiment that is described herein. The figure shows a packet processing process (left hand side) and an inactive flow deletion process (right hand side) that are typically performed separately of one another by system 20.

The packet processing process begins with system 20 receiving packets from network 24A via interface 28A, at a packet input step 70. Data path unit 32 classifies each packet to a respective flow, at a classification step 74. For each packet, unit 32 updates time stamp field 64 of entry 52 of the flow to which the packet belongs with the time-of-arrival of the packet, at a time stamp updating step 78. Unit 32 then processes the packets according to the action field in the respective flow table entries (which in turn depend on the rules), at a processing step 82.

The flow deletion process begins with processor 36 assigning a respective individual time-out period for each flow, at a time-out assignment step 86. Processor 36 then attempts to detect flows that have become inactive. As explained above, the definition of inactivity may differ from one flow to another, depending on the individual time-out periods defined for the flow.

Processor 36 selects a certain flow, at a flow selection step 90. Flow selection may be carried out using various methods or criteria. In one example embodiment, processor 36 scans the flow table periodically (e.g., scan 5% of the flows every second, so that the entire table is scanned every twenty seconds).

In another embodiment, the flow table is implemented using a hashing mechanism. In this embodiment, processor 36 computes a hash index for each incoming packet, and accesses the flow table with this hash index. Since the hashing function is a many-to-one function, a given hash index may correspond to multiple flows. In an embodiment, when a packet corresponding to a given hash index arrives, processor 36 checks all the flows in the table having this hash index. Using this technique, old flows can be deleted without incurring additional memory access operations. This reduction in the number of memory access operations has a high impact on system performance, particularly in high-volume applications. Further alternatively, processor 36 may scan the flows (e.g., scan entries 52 in table 48) using any other suitable criteria.

Processor 36 checks whether the selected flow has become inactive, at an inactivity checking step 94. Typically, the processor checks whether the time that elapsed since arrival of the most recent packet in the selected flow exceeded the individual time-out period of that flow. For example, the processor may measure this elapsed time by comparing the current time with the content of the time stamp field in the entry of the selected flow in table 48.

If the elapsed time does not exceed the time-out period defined for the selected flow, processor 36 retains the entry of this flow in table 48, and the method loops back to step 90 above for selecting the next flow. Otherwise, i.e., is the time that elapsed since the last packet in the flow exceeds the flow's individual time-out period, processor 36 deleted the entry 52 of that flow from flow table 48, at a flow deletion step 98.

Efficient Updating of Specified Actions in Flow Table

As explained above, action field 60 in each entry 52 of flow table 48 specifies the actions that system 20 is to apply to the packets of the respective flow. The content of action fields 60 is typically derived by processor 36 from the rules stored in rule table 44. When one or more rules in table 44 change over time, action fields 60 that are affected by the rule change should be updated accordingly. Failing to do so (e.g., because of the computational cost of the operation) may cause the system to block packets of a newly-found threat only when a new flow arrives, and not in currently-active malicious flows.

In some embodiments, system 20 updates the specified actions in flow table 48 selectively, in response to arrival of packets for processing. This technique considerably reduces the number of updates, and therefore incurs minimal computational complexity.

In an embodiment, system 20 check whether it is necessary to update the action field of the entry of a given flow, only if a rule change has occurred later than the arrival of the latest packet in the flow. In other words, if no packet has arrived in the flow since the rule change, there is no need to update the specified action for this flow. This mechanism also ensures that the specified action of a given flow will be updated at most once following a rule change. Typically, system 20 checks the above-described condition by comparing the time at which the rule change occurred with the time stamp field of the flow table entry.

Figure 3:
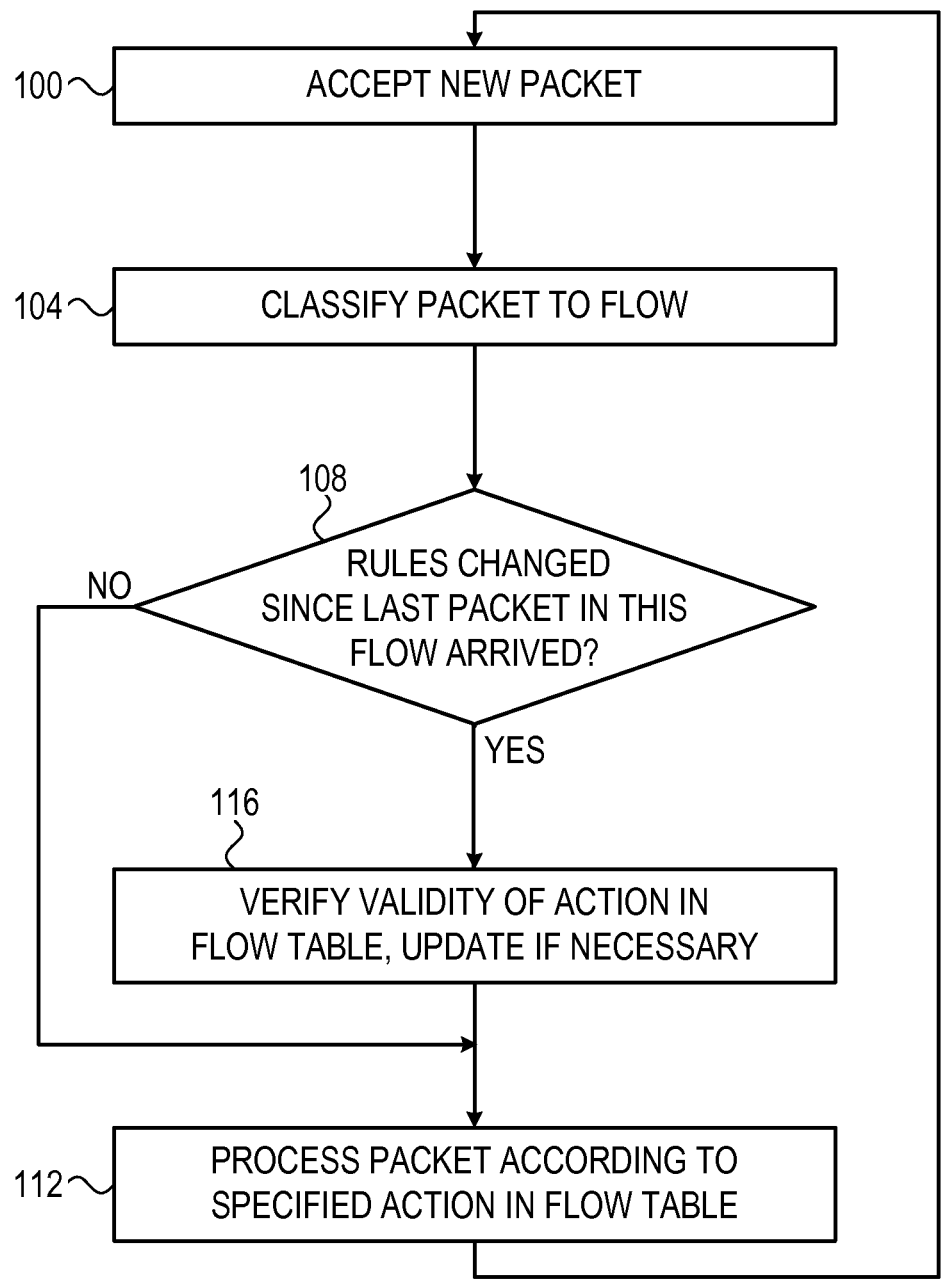

FIG. 3 is a flow chart that schematically illustrates a method for managing flow table 48 in packet processing system 20, in accordance with another embodiment that is described herein. The method begins with system 20 accepting a packet for processing from network 24A via interface 28A, at a packet accepting step 100. Data path unit 32 classifies the packet to a certain flow, at a packet classification step 104.

System 30 (e.g., unit 32 or processor 36) checks whether a rule change has occurred after the previous packet of this flow (i.e., the packet that precedes the presently-processed packet in the flow) has arrived, at a change checking step 108. If not, system 20 proceeds to process the packet according to the action that is specified in field 60 of entry 52 of the flow, at a processing step 112. The method then loops back to step 100 above for processing the next packet.

If, on the other hand, the most recent packet in the flow arrived before the rule change, the specified action for this flow in table 48 may be outdated, i.e., it may not match the updated rules. Therefore, in this case system 20 checks whether the specified action (content of field 60) is still valid in view of the updated rules, at a validity verification step 116. If necessary, system 20 updates field 60 of the flow table entry to reflect the appropriate action that is derived from the updated set of rules.

Note that step 116, which is typically slow and computationally intensive, is skipped for the vast majority of packets. Thus, verification and updating of action fields 60 is carried out selectively, only when needed. This feature is especially important in systems that process large numbers of flows simultaneously.

The methods and systems described herein can be used for efficient management of flow tables in various types of packet processing systems, such as, for example, firewalls, routers, IDS, IPS and DLP systems.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   in a system that processes communication packets, maintaining a list of active packet flows and respective actions that are specified for application to the packet flows, and a set of packet processing rules and a list of packet flows;
   based on the rules, defining respective actions for application to the packet flows;
   accepting a change in the packet processing rules;
   classifying an input packet into a packet flow from the list;
   verifying that a respective action applicable to the packet flow matches the packet processing rules only upon arrival of a first packet belonging to the packet flow following the change in the packet processing rules;
   applying the verified action to the input packet;
   classifying the input packets into the packet flows based on the processing rules, and applying to each input packet a respective action in accordance with the list;
   defining different respective time-out periods for different ones of the packet flows on the list; and
   upon detecting that no packet belonging to a given packet flow was accepted within a respective time-out period of the given packet flow, deleting the given packet flow from the list of the active flows.

2. The method according to claim 1, wherein maintaining the list comprises storing, for each packet flow, a respective time stamp that indicates a respective time at which a most recent packet belonging to the packet flow was accepted, and wherein detecting that no packet was accepted within the time-out period comprises comparing a current time to the respective time stamp of the given packet flow.

3. The method according to claim 1, wherein maintaining the list comprises storing the time-out periods on the list in association with the respective packet flows.

4. The method according to claim 1, wherein defining the time-out periods comprises applying a predefined criterion to the respective packet flows.

5. The method according to claim 1, wherein defining the time-out periods comprises setting the time-out periods based on respective protocol types used for sending the respective packet flows.

6. The method according to claim 1, wherein defining the time-out periods comprises setting the time-out periods based on respective application types whose data are conveyed by the respective packet flows.

7. The method according to claim 1, wherein, for a first packet flow having a first characteristic inter-packet interval and a second packet flow having a second characteristic inter-packet interval that is larger than the first characteristic inter-packet interval, defining the time-out periods comprises setting respective first and second time-out periods for the first and second packet flows, such that the second time-out period is longer than the first time-out period.

8. The method according to claim 1, and comprising selecting the given packet flow for evaluation of the time-out period based on a predefined selection criterion.

9. The method according to claim 8, wherein maintaining the list comprises representing the list by a hash table, wherein classifying the input packets comprises computing a respective hash index for each input packet and accessing the hash table using the hash index, and wherein the selection criterion specifies, upon receiving a given input packet having a given hash index, selection of one or more of the packet flows corresponding to the given hash index.

10. Apparatus, comprising:
    a memory, which is configured to hold a list of active packet flows and respective actions that are specified for application to the packet flows; and
    processing circuitry, which is configured to maintain the list, to classify input packets into the packet flows, wherein the processing circuitry checks whether a rule change has occurred after the previous packet of this flow has arrived, at a change checking step, and if not, proceeds to process the packet according to the action that is specified in field of entry of the flow,
    wherein the processing circuitry applies to each input packet a respective action in accordance with the list, to define different respective time-out periods for different ones of the packet flows on the list, and, upon detecting that no packet belonging to a given packet flow was accepted within a respective time-out period of the given packet flow, deletes the given packet flow from the list of the active flows.

11. The apparatus according to claim 10, wherein the processing circuitry is configured to store on the list, for each packet flow, a respective time stamp that indicates a respective time at which a most recent packet belonging to the packet flow was accepted, and to detect that no packet was accepted within the time-out period by comparing a current time to the respective time stamp of the given packet flow.

12. The apparatus according to claim 10, wherein the processing circuitry is configured to store the time-out periods on the list in association with the respective packet flows.

13. The apparatus according to claim 10, wherein the processing circuitry is configured to define the time-out periods by applying a predefined criterion to the respective packet flows.

14. The apparatus according to claim 10, wherein the processing circuitry is configured to set the time-out periods based on respective protocol types used for sending the respective packet flows.

15. The apparatus according to claim 10, wherein the processing circuitry is configured to set the time-out periods based on respective application types whose data are conveyed by the respective packet flows.

16. The apparatus according to claim 10, wherein, for a first packet flow having a first characteristic inter-packet interval and a second packet flow having a second characteristic inter-packet interval that is larger than the first characteristic inter-packet interval, the processing circuitry is configured to set respective first and second time-out periods for the first and second packet flows, such that the second time-out period is longer than the first time-out period.

17. The apparatus according to claim 10, wherein the processing circuitry is configured to select the given packet flow for evaluation of the time-out period based on a predefined selection criterion.

\* \* \* \* \*